April 7, 1953 C. J. GLASSER 2,633,843
METABOLISM TESTING APPARATUS
Filed June 27, 1950
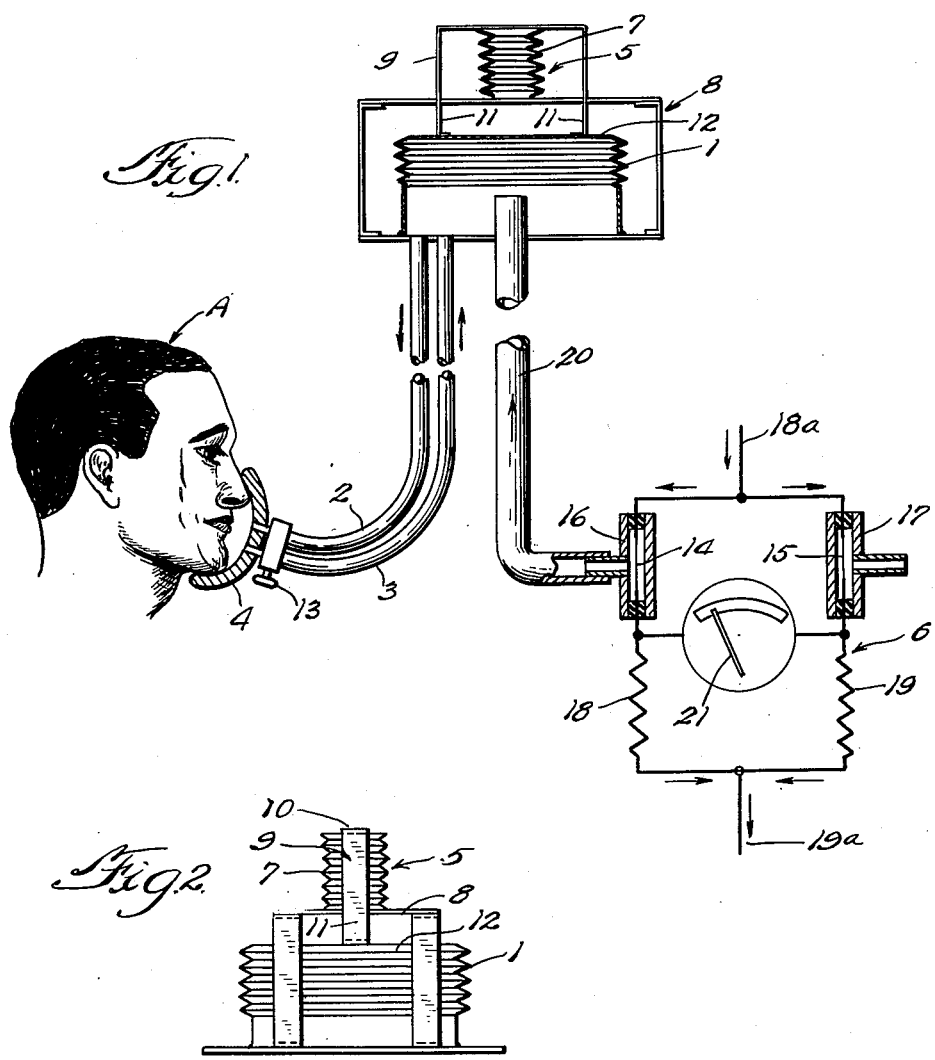
INVENTOR.
Charles J. Glasser.

Patented Apr. 7, 1953

2,633,843

UNITED STATES PATENT OFFICE 2,633,843

METABOLISM TESTING APPARATUS

Charles J. Glasser, Chicago, Ill.

Application June 27, 1950, Serial No. 170,619

4 Claims. (Cl. 128—2.07)

My invention relates to metabolism testing apparatus.

One of the objects of my invention is to provide an improved metabolism testing apparatus in which the gaseous material used in the apparatus may be atmospheric air, thus avoiding the necessity for using pure oxygen.

A further object is to provide such apparatus involving the use of an automatically expansible chamber which will automatically expand or contract so as to contain a predetermined weight of atmospheric air when free communication is established between the expansible chamber and the atmosphere, thus avoiding the necessity for making adjustments or calculations due to changes in atmospheric pressure and temperature.

Further objects and advantages of the invention will be apparent from the description and claims.

The different volume percentages of the various gas constituents of air are well known and substantially constant, and though the weight of a given volume of gas may vary with barometric pressure and temperature, if a container is provided, a portion of which is constructed with a bellows so that the volume of said container may vary in accordance with changes due to temperature and barometric pressure, said container can be made automatically adjustable to contain a fixed weight of air, notwithstanding said changes. In the case of an entirely enclosed bellows filled with air or gas at a predetermined temperature and barometric pressure and in an atmosphere at a lower barometric pressure than the predetermined pressure at which the bellows was sealed, the air in the bellows would expand because of the lower surrounding atmospheric pressure. If the movable or free wall of the sealed bellows is connected to the collapsible or bellows section of the variable volume air container and this container is open to atmosphere, the volume of this air container will change so as to maintain a constant weight of air in the container at the lowered barometric pressure. Thus, a constant weight of air may be admitted and sealed in an air chamber because the entirely enclosed expansible chamber automatically compensates for a change in temperature and change in barometric pressure. Air consists mainly of nitrogen and oxygen in given percentages, the percentage of oxygen being approximately 20.99 per cent by volume. Since the air which people breathe contains oxygen, the large variable volume tank is filled with air containing oxygen from the atmosphere. The openings of this tank are then closed to the general atmosphere and the patient breathes the air contained in this tank, with its percentage of oxygen, and absorbs a portion of the oxygen in the air withdrawn from the tank. The patient will convert a percentage of that oxygen into carbon-dioxide and return to the tank or container the same volume of gas, but with a change in the percentage of oxygen and the addition of carbon-dioxide. After a given time of breathing in and out, the outlets and inlets of the tank are sealed, the tank now containing a lesser amount of oxygen than when sealed and a substantial percentage of carbon-dioxide. One can now by electrically conducted measurement, or any of many numerous well-known methods, measure the percentage of oxygen in the tank, and also measure the percentage of carbon-dioxide in the tank. The percentage of carbon-dioxide in the tank indicates that an equal volume of oxygen has been consumed. Knowing the percentage or volume consumed in a given time, and having automatically compensated for the barometric pressure and temperature, the oxygen consumption rate by weight is automatically obtained, and the age, weight, sex, etc., of the testee being known, the metabolic rate can be determined.

In the drawings in which an embodiment of my invention is shown,

Figure 1 is a somewhat diagrammatic view showing the metabolism testing apparatus in use, and Fig. 2 is a side elevation of part of the apparatus shown in Fig. 1.

Referring to the drawings in detail, the metabolism testing apparatus shown comprises a variable capacity air chamber 1 of the accordion bellows type for holding air to be inhaled and exhaled by the testee A through the tubes 2 and 3 and the mask or mouthpiece 4, means 5 for controlling the expansion and contraction of this chamber to cause it to contain a substantial predetermined weight of air when the chamber 1 is in free communication with the atmosphere, and quantitative thermal conductivity analyzing means 6 for determining the percentages of the gases in the mixture of gases in the chamber 1 after the test has been made.

The means 5 for controlling the expansion and contraction of the expansible chamber may comprise a hermetically sealed expansible and contractible air chamber 7 of the accordion bellows type mounted on a suitable support 8 in definite position with respect to the position of the variable capacity chamber 1, and transmission 9 between the hermetically sealed air chamber 7 and the variable capacity air chamber 1 comprising a yoke having its crossbar 10 secured to the upper end of the hermetically sealed chamber 7 and the lower ends of its arms 11 secured to the upper plate 12 of the expansible chamber 1. A manually operable valve 13 may be provided for opening or closing the passages through the tubes 2 and 3.

In preparing this apparatus for use by the testee, the expansible chamber 1 is placed in free communication with the atmosphere and this chamber expands or contracts until the air pressure inside the chamber is atmospheric air pressure. As the specific gravity of the atmospheric air increases with the barometric pressure and decreases with the temperature and as it is desired that the expansible chamber, when in free communication with the atmosphere, shall contain a volume of air which will have a predetermined weight, the hermetically sealed barometric chamber 7 is provided to accomplish this result. If the atmospheric pressure increases, the hermetically sealed chamber will be compressed, thus lessening the capacity of the expansible chamber 1 so that the volume of air in this container will be lessened as the specific gravity of the air increases. As the specific gravity of the atmospheric air is a function of the temperature, the hermetically sealed chamber 7 will take care of temperature changes also in a manner to insure that the expansible chamber will contain the desired predetermined weight of atmospheric air when in free communication with the atmosphere. As atmospheric air contains roughly only about 20 per cent oxygen by volume, the capacity of the variable capacity chamber will, in general, need to be about five times as large as the capacity of the oxygen chamber now commonly used. The normal capacity of applicant's variable capacity chamber may be around 25 quarts.

In using the apparatus the testee places the mask or mouthpiece in position over the mouth and nose, so as to prevent any leakage of air, and breathes in and out to draw the gases from the expansible chamber 1 into his lungs and to exhale the resulting mixture of gases, including the carbon-dioxide formed, back into the expansible chamber. The volume of gas mixture in the expansible chamber will be substantially the same after each exhalation but the volume of oxygen remaining will be lessened and a corresponding volume of carbon-dioxide will be added. The testee continues to inhale and exhale for a definite period of time until the test is finished. The expansible chamber may then be sealed from communication with the atmosphere by means of the valve 13. The analyzing means 6 will then indicate the relative proportions of oxygen and carbon-dioxide remaining in the chamber 1 and thus the weight of oxygen which has been consumed by the testee.

The analyzing apparatus 6 is a well-known type of apparatus for the quantitative determination of the percentages of the various constituents of the mixture of gases. It comprises two similar current-heated filaments 14 and 15 in two similar cells 16 and 17 and two similar resistances 18 and 19 connected between the conductors 18ª and 19ª to form a Wheatstone bridge. One of the cells 17 may be in communication with the atmosphere and the other cell 16 may be in communication with the collapsible chamber 1 through the tube 20. The indicator 21 is connected across the branch circuits in the usual manner.

In operation the current flow will cause one of the filaments 14 or 15 to become hotter than the other due to the difference in heat conductivity of the gases in the cells 16 and 17. This difference in temperature of the filaments will cause a difference in resistance of the two filaments which will be shown by the action of the indicator 21. This indicator 21 may be calibrated so it will show the amount of oxygen which has been consumed by the testee in the test period.

Further modifications will be apparent to those skilled in the art and it is desired, therefore, that the invention be limited only by the scope of the appended claims.

Having thus described my invention, what I claim and desire to secure by Letters Patent is:

1. Metabolism testing apparatus comprising a variable capacity air chamber for holding air to be inhaled and exhaled by the testee having an air passage affording free communication of said chamber with the atmosphere when the chamber is being prepared for use, means for closing said air passage when the apparatus is to be used, means for controlling the expansion and contraction of said chamber to control the weight of air therein when said air passage is in condition to provide free communication of the chamber with the atmosphere comprising motive means controlled by atmospheric air pressure and temperature for varying the capacity of said air chamber, said motive means comprising a hermetically sealed expansible and contractible gas chamber, and an inhalator in communication with said variable capacity chamber.

2. Metabolism testing apparatus comprising a variable capacity air chamber for holding air to be inhaled and exhaled by the testee having an air passage affording free communication of said chamber with the atmosphere when the chamber is being prepared for use, means for closing said air passage when the apparatus is to be used, means for controlling the expansion and contraction of said chamber to control the weight of air therein when said air passage is in condition to provide free communication of the chamber with the atmosphere comprising motive means controlled by atmospheric air pressure for varying the capacity of said air chamber, said motive means comprising a hermetically sealed expansible and contractible gas chamber, and an inhalator in communication with said variable capacity chamber.

3. Metabolism testing apparatus comprising a variable capacity chamber for holding gas to be inhaled and exhaled by the testee, having provisions for filling it with gas at atmospheric pressure when the apparatus is being prepared for use, and means for controlling the expansion and contraction of said chamber to cause it to contain a substantially constant weight of gas when filled comprising motor means controlled by atmospheric air pressure and temperature for varying the capacity of said inhalable gas chamber, said motor means comprising a hermetically sealed expansible and contractible gas chamber, and an inhalator in communication with said inhalable gas chamber.

4. Metabolism testing apparatus comprising a variable capacity chamber for holding gas to be inhaled and exhaled by the testee, having provisions for filling it with gas at atmospheric pressure when the apparatus is being prepared for use, means for controlling the expansion and contraction of said chamber to cause it to contain a substantially constant weight of gas when filled comprising motor means controlled by atmospheric air pressure and temperature for varying the capacity of said inhalable gas chamber, said motor means comprising a hermetically sealed expansible and contractible gas chamber, and an inhalator in communication with said inhalable gas chamber, and quantitative thermal conductivity analyzing means for determining the percentages of gas in the mixture after the test is made.

CHARLES J. GLASSER.

REFERENCES CITED

The following references are of record in the file of this patent:

UNITED STATES PATENTS

| Number | Name | Date |
| --- | --- | --- |
| 2,221,482 | Jones | Nov. 12, 1940 |
| 2,484,217 | Gardenier | Oct. 11, 1949 |